May 8, 1951 P. HALBIG 2,552,425
METHOD OF PRODUCING VINYL CHLORIDE
Filed Feb. 19, 1948
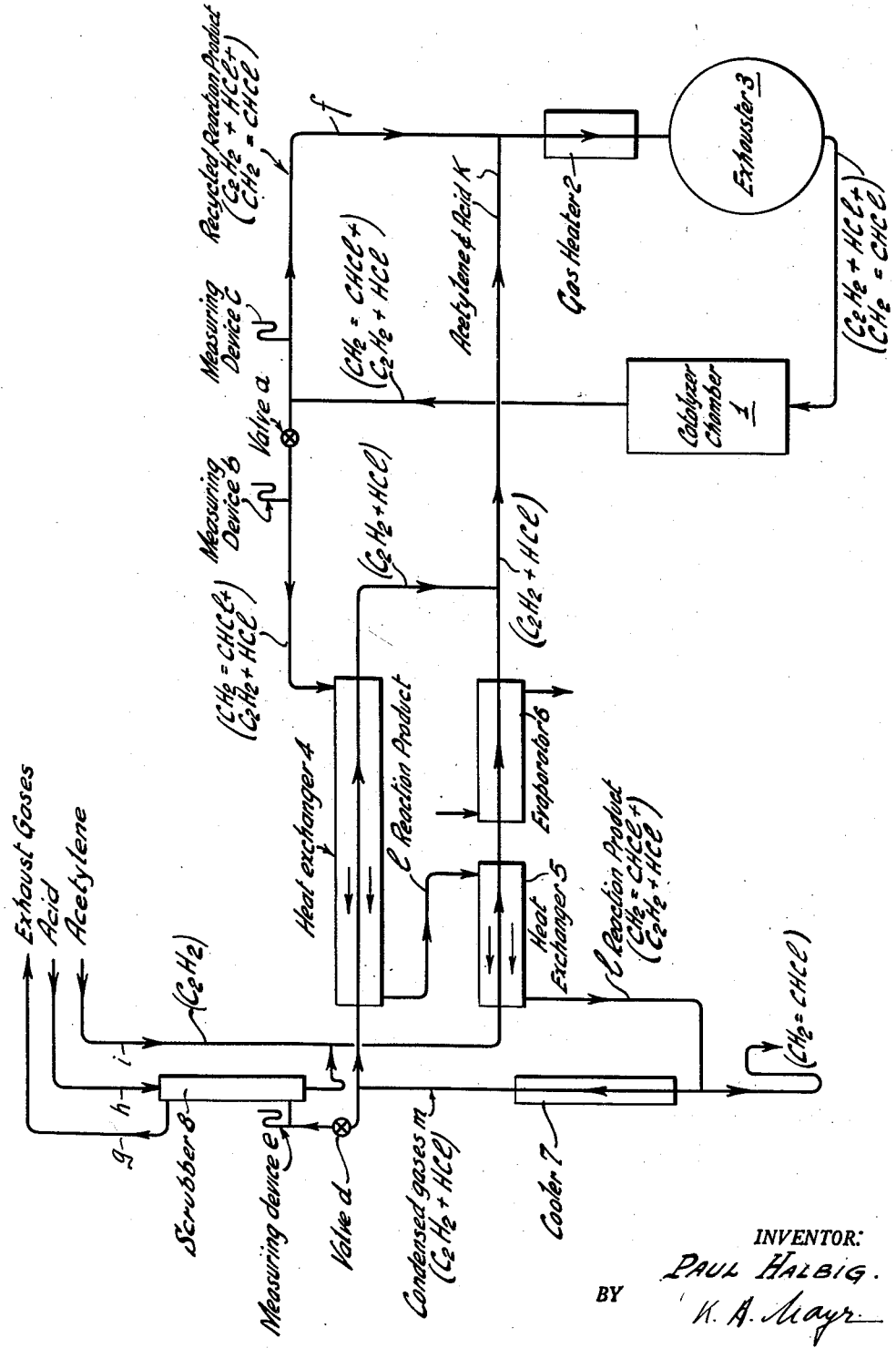
INVENTOR:
PAUL HALBIG.
BY K. A. Mayr
ATTORNEY:

Patented May 8, 1951

2,552,425

UNITED STATES PATENT OFFICE 2,552,425

METHOD OF PRODUCING VINYL CHLORIDE

Paul Halbig, Fribourg, Switzerland

Application February 19, 1948, Serial No. 9,480
In Switzerland September 17, 1941

Section 1, Public Law 690, August 8, 1946
Patent expires September 17, 1961

2 Claims. (Cl. 260—656)

The present invention relates to an improved method of producing vinylester.

It is known to produce vinylalcohol esters by conducting acetylene and acid vapor over heated catalysers, for example zinc acetate, active coal impregnated with perchloride of mercury, and the like. These methods are undesirable because the output is relatively small due to the exothermal reaction process and the produced gas mixture containing generally not more than 20% vinylester.

An object of the present invention is the provision of a method of producing vinylester whereby the action of the catalyser is multiplied and the vinylester concentration is 60% and over, by reconducting a portion of the vinylester obtained from acetylene and acid vapor together with not yet transformed raw materials over the catalyser.

The new method may be carried out by dividing the stream consisting of gas and vapors, emerging from the catalyser chamber, in two parts and reconducting one part over the catalyser without separating the produced vinylester while the vinylester is separated out of the other part and the remainder is again conducted over the catalyser. Depending on the intensity of cooling the produced ester may be thereby practically completely or partly only removed from said other part. Preferably the large part of the gas mixture coming from the catalyser chamber may be conducted into the catalyser chamber without separation of vinylester, and vinylester may be separated from the smaller part of the gas mixture for example by cooling and the remaining portion may be reconducted too into the catalyser chamber. With this method the main portion of the gas mixture which is kept in circulation by an exhauster, remains practically at reaction temperature whereas only a relatively small portion of the gas stream is cooled and must be reheated. Preferably the proportion of the two gas streams is so adjusted that the heat produced by the reaction supplies practically the whole heat required by the process. By the use of heat exchangers and the like heat losses can be avoided in the circuit.

A further object of the present invention resides in the provision of an improved method for producing vinylesters in which the temperature of the catalyser can be held within a narrow range, i. e. maintained without changes. In this way the strong exothermal reaction can be well controlled and the life of the catalyser can be considerably increased.

Another object of the present invention is the provision of a modified method for making vinylester whereby all of the gas mixture emerging from the catalyser is conducted through the separator for the vinylester but only a part of the ester present is separated and the rest of the gas consisting of unconverted raw materials and unseparated vinylesters is reconducted to the catalyser chamber.

The separation of the vinylester may be effected by methods known per se, for example by cooling or scrubbing with selective solvents such as ethylene glycol. I have found, however, that ethylidene chloride is particularly suitable.

Further and other objects of the present invention will be hereinafter set forth in the accompanying specification and claims and shown in the drawing, which, by way of illustration, show what I now consider to be preferred embodiments of my invention.

An example of carrying out the process according to the invention for producing vinyl acetate from acetylene and acetic acid will now be described with the aid of the accompanying drawing:

In the drawing, numeral 1 designates the catalyser chamber, 2 a gas heater for maintaining the plant at operating temperature, 3 an exhauster for circulating the gases, 4 and 5 heat exchangers, 6 an evaporator for not gasified carboxylic acid, 7 a cooler, and 8 a scrubber for the exhaust gas. $a$ and $d$ designate throttle valves for adjusting the gas streams, and $b$, $c$ and $e$ designate devices for measuring the amounts of the flowing gas. Circulation of a portion of the reaction products is controlled by the valve $a$, and the reaction products not passed by the valve $a$ return through conduit $f$ and the gas heater 2 and the exhauster 3 to the catalyser chamber 1 and therefrom to valve $a$. The other part of the reaction products passes valve $a$, then the heat exchangers 4 and 5, and thereafter through the cooler 7 for separating the vinyl acetate. The uncondensed gases return through the heat exchanger 4 to the circuit or through the valve $d$ to the scrubber 8. The acetic acid enters the scrubber battery 8 at $h$ where it washes the exhaust gases discharged at $g$, then mixes with the acetylene entering at $i$, passes the heat exchanger 5 and the evaporator 6 and enters the cycle at $k$.

I shall now set forth an example of proportional quantities, temperatures, pressures, etc. for carrying out my new process: chamber 1 contains 1 liter active coal which is impregnated by about 50 grammes zinc acetate. 15 C. B. M. per hour acetylene at 20° C. and 700 mm. pressure are circulated by the exhauster 3. The temperature is raised in the portion 1, 2, 3 of the plant to 240° C. by means of the heater 2. Then acetic acid is evaporated in the stream of acetylene in the scrubber 8, the heat exchanger 5 and the evaporator 6 at a rate of about 330 grammes per hour. By suitable adjustment of valve a at first only about 100 liters per hour are permitted to pass through heat exchangers 4 and 5 and through cooler 7 until the condensate separated in cooler 7 reaches a vinylacetate concentration of 60%. Then the gas flow is so increased as to maintain a concentration of 60 to 70% which is the case at a flow of about 800 liters per hour. The condensate produced per hour amounts to about 400 grammes and contains 240 to 280 grammes vinyl acetate; the rest is substantially unchanged acetic acid which may return to the cycle, besides negligible amounts of acetaldehyde, acetone and ethylidene diacetate. New acetylene is admitted according to consumption. The amount of waste gas depends substantially on the purity of the acetylene; with pure acetylene it may be so little that the admitted acetic acid suffices to dissolve the acetylene and return it therewith to the plant. When the reaction is in progress, the heater is stopped and the temperature of the catalyser is maintained at 240 to 250° C. by suitable control of the relative proportion of the gas streams, i. e. of the gas stream which circulates over the catalyser without separation of the vinylester to the gas stream from which the ester is separated.

Vinychloride from acetylene and hydrogen chloride has been produced hitherto by separating the vinylchloride from the gas stream leaving the reaction chamber and returning the remaining gas mixture to said chamber. Temperatures of about 160 to 250° C. have been used thereby. This method is disadvantageous because even the best catalysers such as mercury chloride and bismuth chloride sublimate from the porous carrier at these high temperatures causing an early fading out of the reaction. If one operates with less volatile and correspondingly less active catalysers as for example barium chloride or active coal only, the output is very small.

With the method according to the invention, by proper control of the relative amounts of the gas streams the reaction temperature can be held below 150° C. at all times whereby best catalysers as mercury chloride and bismuth chloride can be used and a relatively long life of these is assured. The temperatures may even be maintained considerably below 150° C., for example 50 to 60°. An example of producing vinylchloride according to the invention follows:

A catalyser is produced of active coal and mercury chloride in conventional manner. 20 to 30 C. B. M. per hour acetylene are kept in circulation per liter catalyser. The temperature of the catalyser is raised to 50° C. 150 to 250 liters hydrogen chloride and about the same amount of acetylene are added per hour to the circulating gas whereupon the beginning reaction can be noticed by a slight increase of temperature and contraction. The gas stream emerging from the catalyser chamber is divided into two parts, the larger part returning to the catalyser chamber and the smaller part, amounting to about 2 to 3 C. B. M. of the total circulation of 20 to 30 C. B. M. per hour, i. e. about 10% of the total circulation, being cooled to about 40 to 50° C. below zero. In the coolers about 250 to 350 grammes vinylchloride are condensed per hour together with small amounts of acetylene and hydrogen chloride. The cooled gases return to the cycle over heat exchangers. The temperature of the catalyser is maintained at 50 to 60° C. by increasing or decreasing the gas stream flowing through a cooling plant for separating the ester. The temperature can also be influenced by the amount of hydrogen chloride used. The figure stated above are not indicative of the limit of serviceability of the catalyser.

As has been said before one may also operate in such manner as to conduct the total gas stream coming from the catalyser chamber through the separator and to control the temperature and speed of flow in such a way that only a part of the produced vinyl ester is separated and the remaining gas mixture is returned to the catalyser chamber. The apparatus used thereby is substantially like that illustrated diagrammatically in the drawing with the omission of the conduit f.

It may be added that with the method according to the invention increased formation of ethylidene compounds was not experienced in spite of the high concentration of the esters in the circulating gases.

While I believe the above described embodiments of my invention to be preferred embodiments, I wish it to be understood that I do not desire to be limited to the exact details of method, design and construction shown and described, for obvious modifications will occur to a person skilled in the art.

I claim:

1. The method of producing vinyl chloride, comprising the steps of conducting acetylene and hydrogen chloride vapor over a heated catalyst containing mercury chloride, of dividing the resulting reaction mixture into two parts, of cooling one of said parts and separating vinyl chloride therefrom, of again passing the remainder of the part from which vinyl chloride has been separated together with the other part over the catalyst, and of controlling the amount of mixture, which is cooled, in such a manner that the temperature of the catalyst is maintained at 50° to 60° centigrade.

2. The method of producing vinyl chloride, comprising the steps of conducting acetylene and hydrogen chloride vapor over a heated catalyst containing mercury chloride, of dividing the resulting reaction mixture into two parts, of separating vinyl chloride from one of said parts, of again passing the remainder of the part from which vinyl chloride has been separated together with the other part over the catalyst, and of so proportioning said parts that the heat of reaction of the acetylene with the hydrogen chloride provides the heat required by the process and the temperature of the catalyst is maintained at 50° to 60° centigrade.

PAUL HALBIG.

REFERENCES CITED

The following references are of record in the file of this patent:

UNITED STATES PATENTS

| Number | Name | Date |
|---|---|---|
| 2,186,437 | Toussaint | Jan. 9, 1940 |
| 2,329,795 | Stanley et al. | Sept. 21, 1943 |
| 2,412,308 | Weiler | Dec. 10, 1946 |